United States Patent [19]

Mori et al.

[11] Patent Number: 5,077,127

[45] Date of Patent: Dec. 31, 1991

[54] ADHESIVE FOR BONDING RUBBER TO FIBERS

[75] Inventors: Osamu Mori, Kamakura; Motofumi Oyama; Hiroshi Hisaki, both of Yokosuka; Masato Sekiguchi, Mie; Akinobu Okamura; Haruhiro Tanabe, both of Tsu, all of Japan

[73] Assignee: Nippon Zeon Co., Ltd., Tokyo, Japan

[21] Appl. No.: 643,929

[22] Filed: Jan. 22, 1991

Related U.S. Application Data

[62] Division of Ser. No. 174,866, Mar. 29, 1988, Pat. No. 5,017,639.

[30] Foreign Application Priority Data

Mar. 31, 1987 [JP] Japan ................................ 62-80741
Apr. 30, 1987 [JP] Japan ................................ 62-106742

[51] Int. Cl.$^5$ ............................................... B32B 9/00
[52] U.S. Cl. .................................. 428/390; 428/375; 428/378; 428/392
[58] Field of Search ................. 428/390, 375, 378, 392

[56] References Cited

U.S. PATENT DOCUMENTS

| | | | |
|---|---|---|---|
| 3,240,660 | 3/1966 | Atwell | 161/170 |
| 3,814,713 | 6/1974 | Honda et al. | 524/510 |
| 3,855,168 | 12/1974 | Ozeki et al. | 156/335 |
| 4,048,362 | 9/1977 | Moring et al. | 428/36 |
| 4,404,329 | 9/1983 | Maeda et al. | 525/329.2 |
| 4,560,729 | 12/1985 | Watanabe et al. | 525/233 |
| 4,569,963 | 2/1986 | Hisaki et al. | 524/458 |
| 4,643,938 | 2/1987 | Oyama et al. | 428/268 |

FOREIGN PATENT DOCUMENTS 0194678 9/1986 European Pat. Off. .
2135904 9/1984 United Kingdom .

Primary Examiner—Joseph L. Schofer
Assistant Examiner—J. M. Reddick
Attorney, Agent, or Firm—Sherman & Shalloway

[57] ABSTRACT

An adhesive for bonding a nitrile group-containing highly saturated rubber to glass fibers or organic synthetic fibers, which comprises a nitrile group-containing highly saturated rubber latex having an iodine number of not more than 120 and a resorcinol-formaldehyde resin.

9 Claims, No Drawings

ADHESIVE FOR BONDING RUBBER TO FIBERS

This is a division of application Ser. No. 07/174,866, filed Mar. 29, 1988, now U.S. Pat. No. 5,017,639.

This invention relates to an adhesive for bonding a nitrile group-containing highly saturated rubber to glass fibers or organic synthetic fibers such as polyester fibers or polyamide fibers, and to fibers coated with the adhesive.

In the prior art, reinforcing glass fiber cords or organic synthetic fiber cords used in timing belts, tires, rubber hoses and diaphragms have a coating of an adhesive composed of a mixture (RFL) of resorcinol-formaldehyde resin (RF) and a rubber latex (L). The adhesive coating improves the adhesion of rubber to fibers.

A vinylpyridine/styrene/butadiene copolymer latex, a styrene/butadiene rubber latex, a chloroprene rubber latex and a butadiene rubber latex, for example, have previously been used as the rubber latex (U.S. Pat. No. 3,591,357 and U.S. Pat. No. 3,964,950). Such conventional rubber-reinforcing fibrous cords show good adhesion to chloroprene rubber if the fibers are glass fibers. When the fibers are organic synthetic fibers, the fibrous cords show good adhesion to natural rubber, styrene/butadiene copolymer rubber, acrylonitrile/butadiene copolymer rubber, etc.

In recent years, there has been an increasing demand for heat-resistant rubbers in various fields, and for example, automobile timing belts now require rigorous heat resistance because of the rise in the temperature of automobile engine rooms. Thus, the chloroprene rubber previously used as a belt material has gradually been superseded by hydrogenated nitrile rubber (nitrile group-containing highly saturated rubber). Furthermore, the acrylonitrile/butadiene copolymer rubber as a material for oil-resistant hoses and diaphragms is also being superseded by hydrogenated nitrile rubber.

However, belts, hoses or diaphragms having the glass fiber or organic synthetic fiber cords have a short service life because when the fibrous cords are coated with conventional adhesives composed of RFL, the adhesive coatings have insufficient heat resistance, the coated fibrous cords have a low adhesion strength with respect to hydrogenated nitrile rubber, and after heat aging, their adhesion strength is drastically reduced.

It is known that to improve adhesion of rubber to glass fiber cords, the rubber is treated with a secondary treating agent such as rubber paste composed of a solution of a rubber compound in gasoline [see, for example, Journal of Japanese Adhesion Association, vol. 7, No. 5 (1971), pages 23-29]. Since, however, the heat resistance of the secondary treating agent has insufficient heat resistance, the defect of short life has not been overcome by such a secondary treatment. It was suggested on the other hand to use an adhesive composed of RFL solution containing a latex of chlorosulfonated polyethylene in an attempt to improve the adhesion of hydrogenated nitrile rubber to organic synthetic fibrous cords (European Patent Publication No. 194,678A). No satisfactory results have been obtained with this adhesive.

It is an object of this invention to provide an adhesive which shows a sufficient adhesion strength both at room temperature and after heat aging when it is used for bonding a nitrile group-containing highly saturated rubber to glass fibers or organic synthetic fibers.

This object is achieved in accordance with this invention by an adhesive comprising a latex of a nitrile group-containing highly saturated rubber having an iodine number of not more than 120 and a resorcinol-formaldehyde resin.

In view of the film strength of rubber and the strength of adhesion to rubber, the rubber constituting the nitrile group-containing highly saturated rubber latex should have an iodine number of not more than 120, preferably 0 to 100, especially preferably 0 to 80. The iodine number is determined in accordance with JIS K-0070.

The nitrile group-containing highly saturated rubber constituting the latex may be, for example, a rubber obtained by hydrogenating the conjugated diene units of an unsaturated nitrile/conjugated diene copolymer rubber; an unsaturated nitrile/conjugated diene/ethylenically unsaturated monomer terpolymer rubber; a rubber obtained by hydrogenating the conjugated diene units of the terpolymer rubber; or an unsaturated nitrile/ethylenically unsaturated monomer copolymer rubber. These nitrile group-containing highly saturated polymer rubbers are obtained by ordinary polymerization techniques and ordinary hydrogenation methods. Needless to say, the method of producing the above rubber is not particularly limited in this invention.

Some examples of the monomers used for producing the nitrile group-containing highly saturated rubbers in accordance with this invention are given below.

The unsaturated nitrile may be, for example, acrylonitrile or methacrylonitrile.

The conjugated diene may be, for example, 1,3-butadiene, 2,5-dimethylbutadiene, isoprene, or 1,3-pentadiene.

Examples of the ethylenically unsaturated monomers include unsaturated carboxylic acids such as acrylic acid, methacrylic acid, itaconic acid and maleic acid and salts thereof; esters of the aforesaid unsaturated carboxylic acids such as methyl acrylate, ethyl acrylate, butyl acrylate, 2-ethylhexyl acrylate, trifluoroethyl acrylate and trifluoroethyl methacrylate; alkoxyalkyl esters of the aforesaid unsaturated carboxylic acids such as methoxymethyl acrylate, ethoxyethyl acrylate and methoxyethoxyethyl acrylate; acrylamide and methacrylamide; N-substituted (meth)acrylamides such as N-methylol (meth)acrylamide, N,N'-dimethylol (meth)acrylamide and N-ethoxymethyl (meth)acrylamide; cyanoalkyl (meth)acrylates such as cyanomethyl (meth)acrylate, 2-cyanoethyl (meth)acrylate, 1-cyanopropyl (meth)acrylate, 2-ethyl-6-cyanohexyl (meth)acrylate and 3-cyanopropyl acrylate; and vinylpyridine.

In preparing the unsaturated nitrile/ethylenically unsaturated monomer copolymer rubber, part of the unsaturated monomer may be replaced by a non-conjugated diene such as vinylnorbornene, dicyclopentadiene and 1,4-hexadiene.

The content of the unsaturated nitrile units in the nitrile group-containing highly saturated rubber is usually selected within the range of 10 to 60% by weight in view of the adhesiveness of the rubber and its compatibility with a rubber adherend although this range is not particularly limitative.

Thus, specific examples of the nitrile group-containing highly saturated rubber constituting the latex are hydrogenation products of butadiene/acrylonitrile copolymer rubber, isoprene/butadiene/acrylonitrile copolymer rubber and isoprene/acrylonitrile copolymer rubber; butadiene/methyl acrylate/acrylonitrile copolymer rubber and butadiene/acrylic acid/acrylonitrile copolymer rubber and hydrogenation products of these rubbers; and butadiene/ethylene/acrylonitrile copolymer rubber, butyl acrylate/ethoxyethyl acrylate/vinyl chloroacetate/acrylonitrile copolymer rubber and butyl acrylate/ethoxyethyl acrylate/vinylnorbornene/acrylonitrile copolymer rubber.

The nitrile group-containing highly saturated rubber latex used in this invention is produced by a known phase inversion method if the rubber is a hydrogenated rubber, or by an ordinary emulsion polymerization method if the rubber is not hydrogenated.

According to the phase inversion method, a latex of the nitrile group-containing highly saturated rubber can be obtained by mixing a solution of the nitrile group-containing highly saturated rubber with an aqueous solution of an emulsifier, strongly stirring the mixture to emulsify and disperse the rubber in water as fine particles, and removing the solvent.

The solvent may be those which can dissolve the rubber, for example an aromatic solvent such as benzene, toluene or xylene, a halogenated hydrocarbon solvent such as dichloroethane and chloroform, or a ketone such as methyl ethyl ketone, acetone or tetrahydrofuran.

The emulsifier used in the aqueous solution of the emulsifier may be any of those generally known, for example potassium or sodium salts of fatty acids (e.g., olefinic acid or stearic acid), rosin acid, alkylbenzenesulfonic acids and alkylsulfuric acid esters, and nonionic emulsifiers of the polyoxyethylene type. They may be used either singly or in combination.

The adhesive of this invention is obtained by mixing the above nitrile group-containing highly saturated rubber latex with the resorcinol-formaldehyde resin. The resorcinol-formaldehyde resin may be any type previously known (for example, the one disclosed in Japanese Laid-Open Patent Publication No. 142635/1980), and there is no particular limitation. Usually, the ratio of resorcinol and formaldehyde is preferably 1:0.5-3, more preferably 1:1-2, by weight.

In place of the resorcinol-formaldehyde resin, resorcinol-chlorophenol [such as 2,6-bis(2,4-dihydroxyphenylmethyl)-4-chlorphenol]-formaldehyde resin (e.g., "Vulcabond E" made by ICI) may be used, or a combination of these may be used.

Where the fibers are glass fibers, the weight ratio of the resorcinol-formaldehyde resin to the nitrile group-containing highly saturated rubber latex (solids) is preferably 1:5-15, more preferably 1:8-13. In the case of organic synthetic fibers, the above weight ratio is preferably 1:3-10, more preferably 1:5-8.

In the adhesive of this invention, part of the rubber latex may be replaced by at least one of styrene/butadiene copolymer rubber latex, a modified product thereof, acrylonitrile/butadiene copolymer rubber latex, a modified product thereof, natural rubber latex, etc. in amounts which do not impair the essence of the present invention.

The amount of the adhesive to be coated is preferably 10 to 25% by weight, more preferably 15 to 20% by weight, for glass fibers, and preferably 3 to 10% by weight, more preferably 5 to 8% by weight, for organic synthetic fibers.

After the adhesive of this invention is applied to the fibers in predetermined amounts, the coated fibers are heat-treated at 120° to 350° C., preferably 200° to 300° C. for the glass fibers and 140° to 250° C. for the organic synthetic fibers.

For some types of fibers, it is possible to immerse the fibers in a solution of an isocyanate, a solution of an epoxy compound or a mixture thereof and then dry them before they are immersed in the abovementioned treating solution. In this case, the drying temperature is desirably below the temperature of the subsequent heat-treatment.

The adhesive of this invention may, as required, contain a filler such as carbon black, a vulcanizing agent or a vulcanization accelerator.

The organic synthetic fibers which can be bonded by using the adhesive of this invention may be, for example, polyvinyl alcohol fibers (e.g., Vinylon fibers), polyester fibers and polyamide fibers [e.g., nylon fibers or aramid fibers (aromatic polyamide fibers)]. These organic synthetic fibers and glass fibers may be used in the form of staples, filaments, cords, ropes and canvas.

The nitrile group-containing highly saturated rubber to be bonded to the glass fibers or organic fibers in this invention is composed of the same monomeric units as the nitrile group-containing highly saturated rubber constituting the above rubber latex. The content of unsaturated nitrile units is usually 10 to 60% by weight in view of the oil resistance of a rubber product obtained by bonding the rubber to the fibers. The iodine number of the highly saturated rubber is not more than 120, preferably 0 to 100, more preferably 0 to 80, in view of the heat resistance of the final rubber product.

Bonding of the rubber to the fibers using the adhesive of this invention can be achieved by combining the above adhesive-applied heat-treated fibers with a rubber compound prepared by adding compounding agents such as a vulcanizer or a filler to the rubber, and subjecting the resulting composite to a vulcanization treatment.

The adhesive of this invention gives higher initial adhesion strength than the conventional adhesives, and provides a striking improvement in adhesion strength after heat aging over the case of using the conventional adhesives. The adhesive of this invention can therefore be used advantageously to produce various belts such as timing belts and V-belts, various hoses such as high pressure hydraulic hoses and Freon hoses, and diaphragms in which glass fibers or organic synthetic fibers are used as a tension member.

The following examples illustrate the present invention without any intention of limiting the scope of the invention thereby. In the following examples, all parts and percentages are by weight.

SAMPLE PREPARATION EXAMPLE 1

Preparation of nitrile group-containing highly saturated rubbers

Acrylonitrile/butadiene copolymer rubber (NBR) and acrylonitrile/butadiene/butyl acrylate terpolymer rubber obtained by emulsion polymerization were each dissolved in methyl isobutyl ketone, and each hydrogenated using a Pd-carbon catalyst to prepare hydrogenated NBR and hydrogenated acrylonitrile/butadiene/butyl acrylate terpolymer rubber having the iodine numbers indicated in Table 1.

TABLE 1

| Composition | Rubber | | | | | | | |
|---|---|---|---|---|---|---|---|---|
| | Acrylonitrile/butadiene copolymer rubber | | | | | Acrylonitrile/butadiene/butyl acrylate copolymer rubber | | |
| | a | b | c | d | e (*) | f | g | h |
| Bound acrylonitrile (wt. %) | 37 | 37 | 45 | 37 | 33 | 35 | 35 | 35 |
| Butyl acrylate unit portion (wt. %) | — | — | — | — | — | 60 | 35 | 35 |
| Iodine number | 103 | 51 | 25 | 159 | 308 | 23 | 138 | 23 |

(*) Non-hydrogenated NBR.

SAMPLE PREPARATION EXAMPLE 2

Preparation of latices

Each of the samples (24.6 g) shown in Table 1 was dissolved in a mixture of toluene and dichloroethane (75:25 by volume), and the solution was poured into an aqueous emulsifier solution composed of 1.2 g of potassium oleate, 1.2 g of potassium rosinate, 0.045 g of potassium hydroxide and 300 g of water with stirring, and the mixture was intensely stirred at room temperature by a TK-homomixer (model M made by Tokushu Kika Kogyo K. K.) at a rate of 10,000 revolutions/min. for 10 minutes. The solvent was removed from the emulsifier solution by steam stripping, and the residue was concentrated by an evaporator to obtain a latex having a solid content of about 30%. It was then centrifuged at room temperature at a rate of 3,000 revolutions/min. for 15 minutes to remove the excess of the emulsifier and effect concentration. The solids content and pH of the resulting latex are shown in Table 2.

TABLE 2

| Latex | A | B | C | D | E | F | G | H |
|---|---|---|---|---|---|---|---|---|
| Rubber | a | b | c | d | e | f | g | h |
| Solids content (%) | 45.3 | 45.5 | 45.0 | 45.0 | 45.4 | 45.0 | 45.4 | 45.6 |
| pH | 9.3 | 9.5 | 9.2 | 9.0 | 9.3 | 9.2 | 9.3 | 9.3 |

SAMPLE PREPARATION EXAMPLE 3

Preparation of rubber compound sheets

In accordance with the compounding recipe shown in Table 3, each of the nitrile group-containing highly saturated rubbers was kneaded with the compounding agents as shown in Table 3 on a roll to prepare a rubber compound sheet having a thickness of about 3 mm.

TABLE 3

| Compounding recipe | Rubber compound No. (parts) | | |
|---|---|---|---|
| | I | II | III |
| Zetpol 2020 (*1) | 100 | 100 | — |
| Zetpol 2000 (*2) | — | — | 100 |
| Zinc oxide (#1) | 5 | 5 | 5 |
| Stearic acid | 1 | 1 | — |
| SRF carbon black | 40 | 50 | 50 |
| Sulfur | 0.5 | 0.5 | — |
| Thiokol TP95 (*3) | 5 | — | — |
| Tetramethylthiuram disulfide | 1.5 | 1.5 | — |
| Mercaptobenzothiazole | — | 0.5 | — |
| N-cyclohexyl-2-benzothiazole sulfenamide | 1.0 | — | — |
| Peroximon F040 (*4) | — | 6 | — |

Note
(*1) a product of Nippon Zeon Co., Ltd. (hydrogenated NBR, iodine number 28, bound acrylonitrile 36%)
(*2) a product of Nippon Zeon Co., Ltd. (hydrogenated NBR, iodine number 4, bound acrylonitrile 36%)
(*3) a high-molecular-weight polyether plasticizer (a product of Toray-Thiokol Co., Ltd.)
(*4) α,α'-bis-t-butylperoxide of m,p-diisopropylbenzene (a product of Nippon Oils and Fats Co., Ltd.)

EXAMPLE 1

An adhesive was prepared from latex B and an aqueous solution (solids content 6%) of resorcinol (R)-formaldehyde (F) condensate (R/F=1/1.5) in accordance with the following recipe.

| | |
|---|---|
| Aqueous solution of resorcinol-formaldehyde condensate | 100 parts |
| Latex B | 135 parts |
| Water | 25 parts |

The adhesive was coated on glass fiber strands (filament diameter 9 micrometers; count 150 yards/pound) to a solids pick-up of 18%, and the coated glass strands were heat-treated at 250' C. for 1 minute. A predetermined number of the treated strands were twisted together to obtain rubber reinforcing glass fiber cords (A).

The glass fiber cords (A) was evaluated by subjecting it to a test for an adhesion to the rubber compound sheet (I) shown in Table 3 in the initial stage and after heat aging.

The rubber compound sheet (I) was placed on the glass fiber cords, and the entire assembly was pressured at 150° C. for 30 minutes to produce an adherent sample composed of the glass fiber cords and the rubber compound sheet. The adhesion strengths of the sample before heat aging, and after heat aging for 1 to 10 days at 130° C. were measured (180° peel test at a pulling speed of 50 mm/min.)

For comparison, an adhesive was prepared in accordance with the following recipe.

| | |
|---|---|
| Aqueous solution of resorcinol-formaldehyde condensate (R/F = 1/1.5; solids content 6%) | 100 parts |
| SBR latex (NIPOL LX110 produced by Nippon Zeon Co., Ltd.) | 75 parts |
| Vinylpyridine/styrene/butadiene copolymer latex (NIPOL 2518FS produced by Nippon Zeon Co., Ltd.) | 75 parts |
| Water | 25 parts |

The adhesive was coated on glass fiber strands (filament diameter 9 micrometers; count 150 yards/pound) to a solids pick-up of 18%, and the coated glass strands were heat-treated at 250° C. for 1 minute. Three treated strands were doubled and twisted (2.0 turns/inch) and 13 such strands were doubled and twisted (2.0 turns/inch) in the reverse direction to obtain rubber reinforcing glass fiber cords (B).

The rubber compound (I) was dissolved to a concentration of 15% in a mixed solvent composed of 80 parts of methyl ethyl ketone and 20 parts of toluene. The resulting rubber paste was coated on the above glass fiber cords (B) to a solids pick-up of 2%, and dried at room temperatures. The coated fiber cords (B) were then heat-treated at 120° C. for 5 minutes to prepare glass fiber cords (C).

The glass fiber cords were evaluated in the same way as above, and the results are shown in Table 4.

TABLE 4

| Run No. (*) | Glass fiber cords | Adhesion strength (kg f/25 mm) after heat-treatment for the days indicated | | | | |
|---|---|---|---|---|---|---|
| | | 0 | 1 | 3 | 6 | 10 |
| 1 | A | 19.5 | 18.0 | 18.0 | 17.5 | 17.0 |
| 2 | B | 2.0 | less than 1.0 | less than 1.0 | less than 1.0 | less than 1.0 |
| 3 | C | 20.0 | 16.5 | 15.0 | 13.0 | 12.0 |

(*)Run No. 1 is the invention, and Runs Nos. 2 and 3 are comparisons.

EXAMPLE 2

According to the recipe shown in Table 5, adhesives (RFL solutions) were prepared by mixing the latices A to H indicated in Table 2 with the resorcinol-formaldehyde (RF) resin.

TABLE 5

| RF solution | | RFL solution | |
|---|---|---|---|
| Resorcinol | 11.0 | Latex | 222.2 |
| Formalin (37%) | 6.0 | RF solution | 256.0 |
| NaOH (10%) | 3.0 | Water | 106.8 |
| Water | 246.0 | Total | 585.0 |
| Total | 256.0 | | |

Nylon fiber cords (nylon 6, structure 1260D/2) were immersed in the adhesive prepared as above, and then heat-treated at 200° C. for 2 minutes. The treated cords were held by sheets of the rubber compound (II) or (III) indicated in Table 3 to prepare a sample for a cord pulling test (H test in accordance with ASTM D2138-72). This sample was cured at 160° C. for 20 minutes in the case of the rubber compound (II) and at 170° C. for 20 minutes in the case of the rubber compound (III). To determine the cord pulling strength of the sample after aging, the sample was subjected to an air heat aging test at 120° C. for 2 weeks, and the adhesion strengths in the initial stage and after heat aging were measured, and the results are shown in Table 4.

TABLE 6

| Run No. | Invention | | | | | | | Comparison | | |
|---|---|---|---|---|---|---|---|---|---|---|
| | 4 | 5 | 6 | 7 | 8 | 9 | 10 | 11 | 12 | 13 |
| Latex | A | B | C | F | H | B | H | D | E | G |
| Rubber compound | II | II | II | II | II | III | III | II | II | II |
| Adhesion strength (kg/cm) | | | | | | | | | | |
| Initial | 18.3 | 20.1 | 16.1 | 19.4 | 17.2 | 16.9 | 16.3 | 9.1 | 8.5 | 8.9 |
| After heat aging | 16.9 | 18.8 | 14.3 | 18.1 | 15.8 | 14.7 | 14.1 | 6.0 | 5.3 | 5.8 |

EXAMPLE 3

Aramid fiber cords (Kevlar produced by E. I. du Pont de Nemours & Co.; structure 1500 D/2, 127T/m) were immersed in the pre-testing liquor shown in Table 7, and then in an adhesive prepared in accordance with the recipe shown in Table 8 from the latex shown in Table 8, and then heat-treated at 250° C. for 1 minute.

The treated cords were held by sheets of the rubber compound (II) or (III) indicated in Table 3 and a sample for a cord pulling test was prepared in the same way as in Example 2. The sample was subjected to the same cord pulling test, and the results are shown in Table 9.

TABLE 7

| Composition of the pretreating liquor for the aramid fibers | |
|---|---|
| Glycerol diglycidyl ether | 2.22 parts |
| 10% aqueous NaOH solution | 0.28 part |
| 5% "AEROSOL" OT (75% solids) (*5) | 0.56 part |
| Water | 96.94 parts |
| Total | 100.00 |

(*5)a product of Japan Aerosil Co., Ltd.

TABLE 8

| Composition (parts) of the adhesive (RFL solution) for the aramid fibers | | | |
|---|---|---|---|
| RF solution | | RFL solution | |
| Resorcinol | 11.0 | Latex | 185 |
| Formalin | 5.0 | RF solution | 250 |
| Aqueous NaOH solution | 3.0 | Water | 65 |
| Water | 231.0 | Total | 500 |
| Total | 250.0 | | |

TABLE 9

| Run No. | Invention | | | | Comparison | | |
|---|---|---|---|---|---|---|---|
| | 14 | 15 | 16 | 17 | 18 | 19 | 20 |
| Latex | B | C | H | B | E | E | G |
| Rubber compound | II | II | II | III | II | III | II |
| Adhesion strength (kg/cm) | | | | | | | |
| Initial | 21.6 | 19.8 | 18.9 | 21.3 | 8.8 | 7.1 | 8.3 |
| After heat aging | 20.3 | 18.0 | 17.4 | 19.6 | 5.6 | 5.0 | 5.1 |

Polyester fiber cords (polyethylene terephthalate, structure 1500 D/2) were immersed in the pre-treating solution shown in Table 10, heat-treated at 235° C. for 2 minutes, further immersed in the adhesive prepared in Example 2, and then heat-treated at 235° C. for 2 minutes.

The treated cords were held by sheets of the rubber compound (II) or (III), and a sample for the cord pulling test was prepared. The sample was vulcanized at 160° C. for 20 minutes, and its adhesion strength was measured before and after heat aging. The results are shown in Table 11.

TABLE 10

| Composition of the pre-treating solution for the polyester fibers | |
| --- | --- |
| Solution (L) | |
| DENACOL EX-611 (*6) | 6 parts |
| NEOCOL SW-30 (30%) (*7) | 4 parts |
| Water | 805 parts |
| Solution (2) | |
| CORONATE 2503 (*8) | 14 parts |
| NEOCOL SW-30 (30%) | 4 parts |
| Water | 42 parts |
| Total | 875 parts |

The solutions (1) and (2) were mixed to form the pre-treating solution.
(*6) Sorbitol polyglycidyl ether (produced by Nagase Sangyo K. K.)
(*7) Dioctyl sulfosuccinate Na salt (produced by Daiichi Kogyo Seiyaku K. K.)
(*8) Phenol-blocked 4,4'-diphenylmethane diisocyanate (produced by Japan Polyurethane Co., Ltd.)

TABLE 11

| Run No. | Invention | | | | Comparison | | |
| --- | --- | --- | --- | --- | --- | --- | --- |
|  | 21 | 22 | 23 | 24 | 25 | 26 | 27 |
| Latex | B | C | H | B | E | E | G |
| Rubber compound | II | II | II | III | II | III | II |
| Adhesion strength (kg/cm) | | | | | | | |
| Initial | 23.1 | 20.3 | 20.8 | 22.2 | 10.3 | 8.4 | 9.8 |
| After heat aging | 21.3 | 18.1 | 18.8 | 20.6 | 6.6 | 5.8 | 6.1 |

What we claim is:

1. Glass fibers which are effective for reinforcing nitrile group-containing highly saturated rubbers, said fibers being coated with an adhesive useful for bonding a nitrile group-containing highly saturated rubber to glass fibers, said adhesive comprising a latex of a nitrile group-containing highly saturated rubber having an iodine number of not more than 120 and a resorcinol-formaldehyde resin.

2. The glass fibers of claim 1 wherein the nitrile group-containing highly saturated rubber of said latex is an unsaturated nitrile/conjugated diene/ethylenically unsaturated monomer terpolymer rubber.

3. The glass fibers of claim 2 wherein in said terpolymer rubber, the nitrile is acrylonitrile or methacrylonitrile, the conjugated diene is 1,3-butadiene, 2,5-dimethylbutadiene, isoprene or 1,3-pentadiene, and the ethylenically unsaturated monomer is an unsaturated carboxylic acid, an ester of an unsaturated carboxylic acid, acrylamide, methacrylamide, N-substituted (meth)acrylamide, cyanoalkyl(meth)acrylate or vinylpyridine.

4. The glass fibers of claim 1 wherein the nitrile group-containing highly unsaturated rubber of said latex has from 10 to 60% by weight of unsaturated nitrile units.

5. The glass fibers of claim 1 wherein said nitrile group-containing highly unsaturated rubber of said latex is selected from the group consisting of acrylonitrile/butadiene/butlyacrylate copolymer rubber, butadiene/methylacrylate/acrylonitrile copolymer rubber, butadiene/acrylic acid/acrylonitrile copolymer rubber, hydrogenation products of these rubbers, and butadiene/ethylene/acrylonitrile copolymer rubber.

6. The glass fibers of claim 1 wherein said resorcinol-formaldehyde resin has a ratio of resorcinol and formaldehyde of from 1:0.5 to 1:3.

7. The glass fibers of claim 1 wherein said resorcinol-formaldehyde resin has a ratio of resorcinol and formaldehyde of from 1:1 to 1:2.

8. The glass fibers of claim 1 wherein the weight ratio of the resorcinol-formaldehyde resin to the nitrile group-containing highly saturated rubber latex is from 1:5 to 1:15.

9. The glass fibers of claim 1 wherein the weight ratio of the resorcinol-formaldehyde resin to the nitrile group-containing highly saturated rubber latex is from 1:3 to 1:10.

* * * * *